US006488971B1

(12) United States Patent
Miller et al.

(10) Patent No.: US 6,488,971 B1
(45) Date of Patent: Dec. 3, 2002

(54) RESILIENT PURE CHOCOLATE COATING COMPOSITION FOR NOVELTY ICE CREAM ITEMS

(75) Inventors: Van Miller, Norval (CA); Vladimir Miller, Thornhill (CA); Edward Choy, Thornhill (CA)

(73) Assignee: Cargill Limited, Winnipeg (CA)

( * ) Notice: Subject to any disclaimer, the term of this patent is extended or adjusted under 35 U.S.C. 154(b) by 0 days.

(21) Appl. No.: 09/710,266

(22) Filed: Nov. 13, 2000

(51) Int. Cl.$^7$ .............................. A23P 1/08; A23G 7/02
(52) U.S. Cl. ......................... 426/93; 426/306; 426/631; 426/101
(58) Field of Search ................................. 426/101, 306, 426/631, 91, 93

(56) References Cited

U.S. PATENT DOCUMENTS

| | | | | |
|---|---|---|---|---|
| 4,394,392 A | * | 7/1983 | Tresser | 426/101 |
| 4,396,633 A | * | 8/1983 | Tresser | 426/100 |
| 4,430,350 A | * | 2/1984 | Tresser | 426/101 |
| 4,560,563 A | * | 12/1985 | Tresser | 426/101 |
| 5,591,474 A | * | 1/1997 | Miller | 426/580 |
| 6,071,546 A | * | 6/2000 | Nalur | 426/100 |
| 6,231,901 B1 | * | 5/2001 | Sharkasi | 426/101 |

OTHER PUBLICATIONS

21 CFR, Parts 100–169, 1982. pp. 388–390, 393–394.*
Swern, D. 1979. Bailey's Industrial Oil and Fat Products, vol. 1, 4$^{th}$ edition. John Wiley & Sons, New York, p. 326 & 303.*
Beckett 1988 Industrial Chocolate Manufacture and Use 2nd edition Blackie Academic & Professional, New York p 273–280.*

Minifie 1989 Chocolate, Cocoa and Confectionery Science and Technology 3rd editon AVI Book, Chapman & Hall, New York p 165–169, 300–303.*

Corrihei 1997 Cookware William Morrow & Co, Inc New York p 457–463.*

* cited by examiner

Primary Examiner—Carolyn Paden
(74) Attorney, Agent, or Firm—Marks & Clerk

(57) ABSTRACT

A resilient pure chocolate coating composition for coating novelty ice cream items is provided. The coating composition is anhydrous, having a melting point above 0° C. and below 20° C. It comprises 15% to 50% of chocolate liquor and cocoa butter, 15% to 40% of sugar, and 15% to 50% of butter fat. The coating composition may also further comprise up to 30% whole milk solids, as a milk chocolate coating. The chocolate coating composition is a eutectic composition comprising a cocoa butter fat system and a butter fat system. It provides a coating for ice cream novelty items which is somewhat resilient, less brittle and fragile, and has better mouth sense and organoleptic properties with greater flavor release than chocolate coating compositions that employ vegetable oils as a major constituent.

14 Claims, No Drawings

RESILIENT PURE CHOCOLATE COATING COMPOSITION FOR NOVELTY ICE CREAM ITEMS

FIELD OF THE INVENTION

This invention relates to coatings for ice cream novelty items, and particularly relates to coatings for novelty ice cream items where the coating exhibits resiliency. Typically, the novelty ice cream items are in the form of an ice cream bar on a stick.

BACKGROUND OF THE INVENTION

Coated ice cream novelty items have been known for many years. Such coated ice cream novelty items are typically chocolate coated, although other flavored, sugar and fat based coatings can be used.

The present invention is particularly directed to chocolate coated ice cream novelties; and is particularly directed to so-called "premium" ice cream novelty items. By that, it is meant that the present invention is directed toward high quality ice cream novelty items that sell at a relatively high price in the market and which are comprised of high quality, top grade materials. Such items are generally found in the form of ice cream bars having a stick placed in the middle thereof, but other forms and variations of ice cream items may be found in the market to which the present application is equally relevant.

Typically, lower priced ice cream novelty items may have as much as 30% to 40% of their volume comprised of air—the ice cream being a high over-run product. Moreover, such low priced ice cream novelty items are very often made from ice cream or, indeed, ice milk, which has a low fat content. While such products may be favored by certain sectors of the market because of their low caloric content, they are also less attractive because they have less flavor, or artificially enhanced flavors. Premium novelty ice cream items, on the other hand, generally have less than about 30% volume by air, and have a much higher fat content in the ice cream.

In either event, however, if the novelty ice cream item is coated with a chocolate coating, the chocolate coating may be almost the same. While such coatings are called "chocolate" coatings, in fact they are not pure chocolate coatings. At least in North America, dispensations have been received from Governmental agencies responsibility for the quality and labelling of food items to label the coating as being "chocolate", even though the coating may comprise a high percentage by weight of vegetable oil.

Indeed, coatings that are used on ice cream novelty items must contain, until now, a high percentage by weight of vegetable oil because otherwise their melting point would be far too high. The melting point of chocolate is very high, being well above room temperature; and, in some instances, above mouth temperature. Thus, in order to make the coating composition for the coating on the ice cream to be such that it will not be exceedingly hard and brittle, and have high snap, at temperatures below 0° C., it is necessary to depress the melting point of chocolate. Even the melting point of milk chocolate is very high. Accordingly, manufacturers of ice cream novelty products having chocolate coatings thereon have been awarded the right, in Canada and the United States, to label their products as having a "chocolate" coating even though the melting point of the chocolate or milk chocolate has been depressed by the addition of a vegetable oil thereto. Such vegetable oils are typically cottonseed oil, soybean oil, canola oil, and other long chain oils.

Quite surprisingly, the present inventor has determined that it is possible to lower the melting point of chocolate or milk chocolate to an acceptable level for use as a coating composition for ice cream novelty items, by the addition of butter fat to the chocolate composition. In other words, the present invention comprises a composition that has two fat systems—the chocolate fat system and the butter fat system—and which has a melting point or characteristic SFI curve that is depressed.

Moreover, by the addition of butter fat in keeping with the present invention, the chocolate coating composition will exhibit a noticeable resiliency. That means, that the chocolate coating compositions in keeping with the present invention have a more controlled and gentle snap, are less brittle, and exhibit a less flaky characteristic when first bitten into. This resiliency also has a further advantage in that handling of the products is more easily accommodated with less danger of breaking or cracking the coating on the ice cream bar or other novelty item.

Of course, it is recognized that the cost of adding a butter fat constituent to a coating for ice cream novelty products, as opposed to depressing the melting point thereof by the use of vegetable oil, may significantly increase the costs of the chocolate coating composition. Nonetheless, when the chocolate coating composition is used in association with premium quality ice cream to produce high quality, high priced ice cream novelty items, then the added cost to the coating composition when viewed in relation to the price of the product, may be less significant than it would otherwise appear.

Still further, an advantage of employing a resilient chocolate coating composition in keeping with the present invention is such that the manufacturer of the ice cream novelty product can label and advertise the product as comprising pure chocolate.

In other words, the labelling can provide a list of constituents for the chocolate coating such that it may recite only chocolate liquor and cocoa butter, sugar, and butter fat; and, optionally but usually, whole milk solids. Other trace constituents such as vanilla or other flavoring, or lecithin, might also be employed, as described hereafter.

As employed herein, the term "chocolate coating" may mean a dark chocolate coating or it may mean a milk chocolate coating—one which includes whole milk solids.

The resilient pure chocolate coating composition of the present invention provides a eutectic composition in the truest sense of the word. The composition is such that the two fat systems, the chocolate fat system and the butter fat system, and indistinguishable one from the other. Moreover, the mouth feel or organoleptic release of flavor of the chocolate coating is different from chocolate coatings as they are presently found in the market because the tongue senses a smoother, softer, less crispy chocolate film or coating, having a softer or less pronounced snap, together with a more complete and more rapid release of flavour.

DESCRIPTION OF THE PRIOR ART

In U.S. Pat. No. 5,591,474 issued Jan. 7, 1997, the inventor herein has provided a method of preparation of chocolate crumb. In that patent, the present inventor teaches an anhydrous chocolate crumb where anhydrous butter fat may be added to a dried mix so as to provide a final analysis for the total amount of dried milks and anhydrous butter fat up to specified amounts.

In another U.S. Pat. No. 5,672,373 issued Sep. 30, 1997, the present inventor has provided a method of producing anhydrous whole milk powder having full fat recovery for further use. There, the anhydrous milk powder is added back to dried skim milk in designated quantities, and blended so as to have the same constituent make-up of ordinary dry whole milk, but wherein all of the fat constituent is recoverable as fat. That anhydrous milk powder is particularly intended for use by the chocolate industry, in the manufacture of milk chocolate; although it may also be used in the manufacture of dry baking mixes or other prepared foods where dried milk powder is not to be re-hydrated.

WARKENTIN U.S. Pat. No. 3,959,516 issued May 25, 1976 teaches a classic method for producing a solid chocolate composition which is suitable for coating ice cream. Here, cocoa powder is milled, with or without an additional chocolate liquor, but together with sugar, hydrogenated vegetable oil, salt, lecithin, and optionally whey powder or low fat milk powder. The purpose is to provide wafers of chocolate which have a softening point of about 100° F., which solid chocolate wafers are easily handled. When a chocolate coating for ice cream is intended to be made, the wafers are stirred into warm vegetable oil, having a temperature of about 110° to 130° F., in the ratio of approximately 50% by weight of solid chocolate wafers and about 50% by weight of warm vegetable oil. Obviously, the chocolate coating composition which is thus prepared has a very high vegetable oil constituent. Thus, while the chocolate coating is referred to as such, it is not, in fact, pure chocolate.

CAIN et al., in U.S. Pat. No. 5,858,427 issued Jan. 12, 1999, teach a flexible ice cream coating composition which is intended to be used, for example, in coating an ice cream cone into which ice cream will later be placed. The coating may have a high unsaturated fat constituency, but it is in any event made from oils such as palm oil, shea, lillipe, together with cocoa butter or factions thereof, along with sunflower oil, maize oil, soyabean oil, olive oil, safflower oil, or canola oils.

U.S. Pat. No. 5,556,659 issued Sep. 17, 1996 to DePEDRO et al. teaches a reduced-calorie coated frozen confectionery. Here, the coating is a water-in-oil emulsion which contains up to 55% by weight of water.

Published Japanese patent application No. 62113800, published Nov. 16, 1988, in the name of FUJII et al. teaches a coating composition for a frozen dessert that employs an edible oil, cocoa butter, skim milk powder, sweetener, emulsifying agent, and water.

SUMMARY OF THE INVENTION

In accordance with one aspect of the present invention, there is provided a resilient pure chocolate coating composition for coating novelty ice cream items, which coating composition is anhydrous, and has a melting point above 0° C. and below 20° C. The composition comprises:

| | |
|---|---|
| 15% to 50% | chocolate liquor and cocoa butter |
| 15% to 40% | sugar |
| 15% to 50% | butter fat |

As a milk chocolate coating, the present invention provides a resilient milk chocolate coating having the composition described above, but further comprising up to 30% whole milk solids.

The anhydrous chocolate coating composition of the present invention may further comprise up to 1% vanilla flavoring. It may also comprise up to 1% lecithin.

Representative SFI characteristics for various cocoa butter: butter fat eutectic mixtures are as follows, it being understood that the figures indicated below are exemplary and not limiting. Specifically, the SFI characteristics may vary as a consequence of a number of facts, including but limited to: the source of the cocoa butter (Brazil, Malaysia, etc.); whether the butter fat is winter or summer fat, the breed or variety of cattle, whether they were range fed or stabled, and so on. Nonetheless, typical SFI characteristics of cocoa butter: butter fat eutectic mixtures are as follows:

| SOLID FAT INDEX (SFI) IN MIXTURES OF COCOA BUTTER: BUTTER FAT | | | |
|---|---|---|---|
| | 80:20 | 50:50 | 20:80 |
| 50° | 75% | 55% | 60% |
| 70° | 60% | 34% | 18% |
| 84° | 50% | 27% | 13% |
| 92° | 25% | 10% | 4% |
| 104° | 0% | 0% | 0% |

Another aspect of the present invention is to provide an ice cream novelty item which comprises an ice cream core, and a chocolate coating on the ice cream core, as described above.

Typically, the thickness of the chocolate coating on the ice cream core is in the range of from 0.8 mm to 3.0 mm.

A further aspect of the present invention is to provide a method of making an anhydrous resilient pure chocolate coating composition for coating ice cream novelty items, where the composition is as noted above. The method comprises the steps of:

(a) mixing the chocolate liquor and cocoa butter constituent together with the sugar constituent;

(b) drying the mixture of step (a) to form a powder;

(c) adding anhydrous butter fat to the powder; and (d) conching the mixture of step (c).

Where the pure chocolate coating composition is a milk chocolate, it will comprise up to 30% whole milk solids. The whole milk solids are added in either step (a) or step (c).

Still further, the present invention provides a method of making an ice cream novelty item where the method of making the ice cream novelty item comprises the steps of:

(a) preparing the ice cream core and cooling the same to a temperature below −20° C.;

(b) preparing the anhydrous resilient pure chocolate coating or milk chocolate coating;

(c) heating the anhydrous resilient pure chocolate coating or milk chocolate coating to a temperature above 38° C.;

(d) applying the heated pure chocolate coating or milk chocolate coating to the ice cream core, and permitting the coating to harden; and (e) packaging the coated ice cream novelty of step (d).

DETAILED DESCRIPTION OF THE PREFERRED EMBODIMENTS

The novel features which are believed to be characteristic of the present invention, as to its structure, organization, use and method of operation, together with further objectives and advantages thereof, will be better understood from the following discussion.

Specifically, by providing a resilient pure chocolate coating composition for coating novelty ice cream items, the present invention provides such a coating composition that has a melting point above 0° C. and below 20° C. That is, the melting point is above the freezing point of water, but below room temperature. At any temperature above 0° C., up to room temperature, the chocolate coating composition will become soft, but not runny. Because the chocolate coating composition of the present invention is a eutectic composition, it is very stable over a wide temperature range. However, at a temperature generally above about 38° C., the SFI characteristic is such that the chocolate composition will have been totally liquified so that there are no crystal nucleii in the liquid. It is for that reason that the chocolate coating composition is heated to such a temperature before it is coated onto an ice cream core, as discussed hereafter.

It should be noted that the chocolate coating composition of the present invention exhibits a less flaky characteristic at low temperatures, as compared with present chocolate coating compositions that have relatively high vegetable fat content. This is particularly due to the fact that butter fat is employed in the chocolate coating composition of the present invention. Of course, butter fat has many different fatty acids in the very complex fat system which comprises butter fat—as many as eighteen different fatty acids are present in a fatty acid profile of butter fat—so that there is less brittleness, a less defined snap, and thereby a less flaky characteristic of the chocolate coating.

Unlike the present practice, the present invention permits the chocolate coating compositions to be made without necessarily employing the use of lecithin. However, if lecithin is used, it is generally present in an amount less than 1%; and if lecithin is present, it acts as a scavenger which will bind any free water that might be present so as to remove that water from the fat sugar system—the two fat eutectic.

Moreover, as noted above, the eutectic properties of the chocolate coating compositions of the present invention permit an organoleptic phenomenon whereby the chocolate coating composition is sensed as melting easily in the mouth with fast and full flavor release, and without brittleness or a high snap factor.

Of course, the present invention provides for the chocolate coating composition to be a milk chocolate, having up to 30% while milk solids.

In either event—dark chocolate or milk chocolate—flavoring, particularly vanilla, may be used in an amount of up to about 1%.

Typical SFI curves for butter fat and cocoa butter yield the following tables:

| TYPICAL SFI CHARACTERISTICS FOR COCOA BUTTER AND BUTTER FAT | | |
|---|---|---|
| | COCOA BUTTER | BUTTER FAT |
| 10° C. | 65–75% | 35–40% |
| 21.1° C. | 46–51% | 11–18% |
| 28.9° C. | 18–30% | 5–11% |
| 33.3° C. | 5–8% | 0–4% |
| 40° C. | 0% | 0% |

The butter fat will have an Iodine Value of 30–40; the cocoa butter will have an Iodine Value of 82–95.

Various typical fat index properties for different mixture of cocoa butter : butter fat are shown in the following table, which is representative only but not limiting, as discussed above:

| SOLID FAT INDEX (SFI) IN MIXTURES OF COCOA BUTTER:BUTTER FAT | | | |
|---|---|---|---|
| | 80:20 | 50:50 | 20:80 |
| 10° | 75% | 55% | 60% |
| 21.1° | 60% | 34% | 18% |
| 28.9° | 50% | 27% | 13% |
| 33.3° | 25% | 10% | 4% |
| 40° | 0% | 0% | 0% |

It will be seen from the SFI characteristics noted above that, while the chocolate coating compositions of the present invention have high solid contents below 0° C., and are liquid above about 40° C. Also, they exhibit relative stability at room temperature, for example.

Moreover, it is seen that the melting characteristics of any cocoa butter : butter fat eutectic mixture are such that as the ratio goes towards more butter fat and less cocoa butter, the melting point decreases, so that at 33.3° C., for example, there are less solids in a typical 20:80 mixture than an 80:20 mixture, or even 50:50 mixture.

Still further, the fact of the eutectic composition of the chocolate coating compositions is such that resiliency of the chocolate coating composition is apparent at temperatures below 0° C., thus reducing the brittleness and fragility of the coating as it is in place on the ice cream core.

An ice cream novelty item comprises an ice cream core and a chocolate coating composition placed thereon, where the chocolate coating composition is as described above. Typically, the ice cream core is of the sort which is formed in an ice cream bar having a stick placed in the centre thereof—such embodiments being those that are generally found in the premium quality ice cream novelty market.

Typically, the thickness of the chocolate coating on the ice cream core is in the range of 0.8 mm to 3.0 mm. The thickness of the coating is, of course, controlled as a consequence of specific manufacturing steps which are outside the scope of the present invention. Very often, chocolate coatings on ice cream cores in premium quality ice cream novelty items is about 2 mm.

To manufacture the anhydrous resilient pure chocolate coating composition of the present invention, the steps noted below can be carried out using machinery which may already be in place. Specifically, the following steps may be carried out:

(a) First, the chocolate liquor and cocoa butter constituents are mixed together with the sugar constituent, using ordinary and conventional ribbon blenders or the like.

(b) The mixture of step (a) is then dried, typically using a firewall drier or other conventional driers, so as to form a powder.

(c) Then, anhydrous butter fat is added to the powder, again using conventional equipment such as a ribbon blender.

(d) Finally, the mixture is conched, using conventional conching equipment.

Where the anhydrous pure chocolate coating composition of the present invention is a milk chocolate coating composition, it will comprise an additional whole milk solids constituent in a range of up to 30%. That whole milk solids constituent may be added to the mixture in either step (a) or step (c), noted above.

When an ice cream novelty item is to be manufactured, which ice cream novelty item will have a chocolate composition coating in keeping with the present invention, the procedure for making the ice cream novelty item is as follows:

(a) First, the ice cream core for the ice cream novelty item is prepared, and it is cooled to a temperature below −20° C.

(b) Also, the anhydrous resilient pure chocolate coating is prepared, in the manner described above.

(c) The anhydrous resilient pure chocolate coating is heated to a temperature above 400° C.—typically, up to about 43° C.—so as to ensure elimination of any crystalline nucleii from the liquid phase of the pure chocolate coating composition.

(d) The heated pure chocolate coating is then applied to the ice cream core, and permitted to harden. Obviously, there will be a temperature difference of about 60° C., or more, between the liquid chocolate coating composition and the ice cream core; but the mass of the ice cream core is very considerably greater than that of the 0.8 mm to 3 mm coating on the ice cream core, so the chocolate composition coating will cool and harden quite quickly. Indeed, while it is noted that, when there is less cocoa butter available to direct the crystallization, the crystallization will be more arbitrary. However, when the chocolate coating is applied to the ice cream core, as noted immediately above, the crystal structure is instant and uniform.

(e) Thereafter, the coated ice cream novelty product of step (d) is packaged.

Because of the resiliency of the chocolate coating composition, handing of the ice cream novelty item during packaging is less critical than has heretofore been the case.

Moreover, as noted above, the resiliency of the chocolate coating composition of the present invention means that there is less likelihood for the chocolate coating to break into flakes or chunks, sometimes with disastrous results as far as the person who is consuming the ice cream novelty item at the time may be concerned.

As described above, the use of butter fat to reduce the melting point of chocolate, instead of vegetable oils such as coconut oil, palm kernel oil, or the like, which oils may be hydrogenated or modified, results in a chocolate coating composition which is a pure or all natural chocolate product, as it is defined in the North American market. The eutectic composition having two fat systems with a depressed melting curve relative to that of cocoa butter is also less brittle and thereby more resilient than prior art systems. Such prior art systems are not generally eutectic, thereby resulting in bloom or weeping of the chocolate coating, in some circumstances and conditions.

There has been described a chocolate coating composition which is particularly adapted for use as a coating for ice cream in chocolate coated ice cream novelty items. It should be noted that additional ingredients might be added as the liquid chocolate coating composition is applied to the ice cream core, for example nut particles such as sliced or slivered almonds, peanuts, macadamia, or other nuts, may be applied to the ice cream novelty product in some circumstances for some markets.

Other modifications and alterations may be used in the design and manufacture of the apparatus of the present invention without departing from the spirit and scope of the accompanying claims.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

What is claimed is:

1. An anhydrous resilient pure chocolate coating composition for coating novelty ice cream items, said coating composition having a melting point above 0° C. and below 20° C., and comprising:

| | |
|---|---|
| 15% to 50% | chocolate liquor and cocoa butter |
| 15% to 40% | sugar |
| 15% to 50% | butter fat | wherein said cocoa butter and said butter fat form a eutectic mixture; and wherein representative SFI characteristics for various cocoa butter: butter fat eutectic mixtures as follows:

| SOLID FAT INDEX (SFI) IN MIXTURES OF COCOA BUTTER:BUTTER FAT | | |
|---|---|---|
| 80:20 | 50:50 | 20:80 |
| 10° 75% | 55% | 60% |
| 21.1° 60% | 34% | 18% |
| 28.9° 50% | 27% | 13% |
| 33.3° 25% | 10% | 4% |
| 40° 0% | 0% | 0% |

2. The anhydrous chocolate coating composition of claim 1, where said chocolate is a milk chocolate and further comprises up to 30% whole milk solids.

3. The anhydrous chocolate coating composition of claim 2, further comprising up to 1% vanilla flavoring.

4. The anhydrous chocolate coating composition of claim 2, further comprising up to 1% lecithin.

5. An ice cream novelty item comprising an ice cream core, and a milk chocolate coating as claimed in claim 2, on said ice cream core.

6. The ice cream novelty item of claim 5, where the thickness of said milk chocolate coating is in the range of 0.8 mm to 3.0 mm.

7. A method of making an ice cream novelty item as claimed in claim 5, said method comprising the steps of:

(a) preparing said ice cream core and cooling the same to a temperature below −20° C.;

(b) preparing said anhydrous resilient milk chocolate coating;

(c) heating said anhydrous resilient milk chocolate coating to a temperature of above 40° C.;

(d) applying the heated milk chocolate coating to said ice cream core, and permitting the coating to harden; and (e) packaging the coated ice cream novelty product of step (d).

8. The anhydrous chocolate coating composition of claim 1, further comprising up to 1% vanilla flavoring.

9. The anhydrous chocolate coating composition of claim 1, further comprising up to 1% lecithin.

10. An ice cream novelty item comprising an ice cream core, and a pure chocolate coating as claimed in claim 1, on said ice cream core.

11. The ice cream novelty item of claim 10, where the thickness of said pure chocolate coating is in the range of 0.8 mm to 3.0 mm.

12. A method of making an ice cream novelty item as claimed in claim 10, said method comprising the steps of:
  (a) preparing said ice cream core and cooling the same to a temperature below −20° C.;
  (b) preparing said anhydrous resilient pure chocolate coating;
  (c) heating said anhydrous resilient pure chocolate coating to a temperature of above 40° C.;
  (d) applying the heated pure chocolate coating to said ice cream core, and permitting the coating to harden; and
  (e) packaging the coated ice cream novelty product of step (d).

13. A method of making an anhydrous resilient pure chocolate coating composition for coating ice cream novelty items, where said composition comprises:

| | |
|---|---|
| 15% to 50% | chocolate liquor and cocoa butter |
| 15% to 40% | sugar |
| 15% to 50% | butter fat | wherein said cocoa butter and said butter fat form a eutectic mixture; and wherein representative SFI characteristics for various cocoa butter: butter fat eutectic mixtures as follows:

| SOLID FAT INDEX (SFI) IN MIXTURES OF COCOA BUTTER:BUTTER FAT | | | |
|---|---|---|---|
| | 80:20 | 50:50 | 20:80 |
| 10° | 75% | 55% | 60% |
| 21.1° | 60% | 34% | 18% |
| 28.9° | 50% | 27% | 13% |
| 33.3° | 25% | 10% | 4% |
| 40° | 0% | 0% | 0% | said method comprising the steps of:
  (f) mixing said chocolate liquor and cocoa butter constituent together with said sugar constituent;
  (g) drying the mixture of step (f) to form a powder;
  (h) adding anhydrous butter fat to said powder; and
  (i) conching the mixture of step (h).

14. The method of claim 13, wherein said anhydrous pure chocolate coating composition is a milk chocolate, and further comprises up to 30% whole milk solids, wherein:

said whole milk solids are added in step (f) or in step (h).

* * * * *